(12) United States Patent
Baek

(10) Patent No.: US 9,063,711 B2
(45) Date of Patent: *Jun. 23, 2015

(54) SOFTWARE ENGINEERING SYSTEM AND METHOD FOR SELF-ADAPTIVE DYNAMIC SOFTWARE COMPONENTS

(71) Applicant: International Business Machines Corporation, Armonk, NY (US)

(72) Inventor: Ock Kee Baek, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,775

(22) Filed: Oct. 21, 2013

(65) Prior Publication Data

US 2014/0181790 A1    Jun. 26, 2014

Related U.S. Application Data

(63) Continuation of application No. 12/187,410, filed on Aug. 7, 2008, now Pat. No. 8,589,873.

(30) Foreign Application Priority Data

Oct. 22, 2007    (CA) ..................................... 2607537

(51) Int. Cl.
*G06F 9/44*    (2006.01)
(52) U.S. Cl.
CPC ....................................... *G06F 8/20* (2013.01)
(58) Field of Classification Search
CPC ....................................................... G06F 8/34

USPC ......................... 717/100–125, 138, 166–173
See application file for complete search history.

(56) References Cited

U.S. PATENT DOCUMENTS

| 5,751,909 | A | 5/1998 | Gower |
|---|---|---|---|
| 5,790,847 | A | 8/1998 | Fisk |
| 5,970,490 | A | 10/1999 | Morgenstern |
| 6,101,489 | A | 8/2000 | Lannert |
| 6,256,771 | B1 | 7/2001 | O'Neil |
| 6,311,194 | B1 | 10/2001 | Sheth |
| 6,330,710 | B1 | 12/2001 | O'Neil |

(Continued)

OTHER PUBLICATIONS

Rasche, A. and Polze A., Configuration and Dynamic Reconfiguration of Component Based Applications with Microsoft .Net, ISORC'03 (2003).*

(Continued)

*Primary Examiner* — Satish Rampuria
(74) *Attorney, Agent, or Firm* — George R. McGuire; Bond Schoeneck & King, PLLC; John Pivnichny

(57) ABSTRACT

There is disclosed a software engineering system and method for engineering software components. In an embodiment, the method comprises providing the software component with an input interface, an output interface, and a control interface, the control interface being configurable to receive external conditions or parameters that are specific to an environment or to a domain; and providing one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed.

12 Claims, 8 Drawing Sheets

(56) References Cited

U.S. PATENT DOCUMENTS

| | | | |
|---|---|---|---|
| 6,345,386 | B1 | 2/2002 | Delo |
| 6,353,446 | B1 | 3/2002 | Vaughn |
| 6,389,589 | B1 | 5/2002 | Mishra |
| 6,418,554 | B1 | 7/2002 | Delo |
| 6,439,882 | B2 | 8/2002 | Haynes |
| 6,463,445 | B1 | 10/2002 | Suzuki |
| 6,523,166 | B1 | 2/2003 | Mishra |
| 6,523,172 | B1 | 2/2003 | Martinez-Guerra |
| 6,538,667 | B1 | 3/2003 | Duursma |
| 6,539,404 | B1 * | 3/2003 | Ouchi .......................... 715/205 |
| 6,658,425 | B1 | 12/2003 | Sluiman |
| 6,677,963 | B1 | 1/2004 | Mani |
| 6,836,794 | B1 | 12/2004 | Lucovsky |
| 6,895,409 | B2 | 5/2005 | Uluakar |
| 6,959,320 | B2 | 10/2005 | Shah |
| 7,062,765 | B1 | 6/2006 | Pitzel |
| 7,139,752 | B2 | 11/2006 | Broder |
| 7,185,335 | B2 | 2/2007 | Hind |
| 7,209,923 | B1 | 4/2007 | Cooper |
| 7,222,341 | B2 | 5/2007 | Forbes |
| 7,433,876 | B2 | 10/2008 | Spivack |
| 7,478,105 | B2 | 1/2009 | Albornoz |
| 7,516,229 | B2 | 4/2009 | Trastour |
| 7,526,771 | B2 * | 4/2009 | Roman et al. .................. 719/316 |
| 7,574,652 | B2 | 8/2009 | Lennon |
| 7,702,645 | B2 | 4/2010 | Khushraj |
| 7,702,673 | B2 | 4/2010 | Hull |
| 2002/0052883 | A1 | 5/2002 | Weissman-Berman |
| 2002/0069083 | A1 | 6/2002 | Harter |
| 2002/0116374 | A1 | 8/2002 | Bette |
| 2002/0124270 | A1 | 9/2002 | Mori |
| 2002/0166001 | A1 | 11/2002 | Cheng |
| 2003/0084165 | A1 | 5/2003 | Kjellberg |
| 2003/0090514 | A1 | 5/2003 | Cole |
| 2003/0107596 | A1 | 6/2003 | Jameson |
| 2003/0131073 | A1 | 7/2003 | Lucovsky |
| 2003/0158823 | A1 | 8/2003 | Fulton |
| 2003/0195980 | A1 | 10/2003 | Geshwind |
| 2003/0197733 | A1 | 10/2003 | Beauchamp |
| 2003/0221190 | A1 | 11/2003 | Deshpande |
| 2003/0237050 | A1 | 12/2003 | Davidov |
| 2004/0002991 | A1 | 1/2004 | Bogdan |
| 2004/0024875 | A1 | 2/2004 | Horvitz |
| 2004/0044636 | A1 | 3/2004 | Casati |
| 2004/0113949 | A1 | 6/2004 | Cooper |
| 2004/0150669 | A1 | 8/2004 | Sabiers |
| 2004/0176968 | A1 | 9/2004 | Syed |
| 2004/0225968 | A1 | 11/2004 | Look |
| 2004/0228607 | A1 | 11/2004 | Tsutsumitake |
| 2004/0261069 | A1 | 12/2004 | Verbeke |
| 2005/0120353 | A1 | 6/2005 | Zhang |
| 2005/0125519 | A1 | 6/2005 | Yang |
| 2006/0074980 | A1 | 4/2006 | Sarkar |
| 2006/0206348 | A1 | 9/2006 | Chen |
| 2006/0253397 | A1 | 11/2006 | Gomez |
| 2006/0277089 | A1 | 12/2006 | Hubbard |
| 2007/0033659 | A1 * | 2/2007 | Hoche et al. ..................... 726/28 |
| 2007/0174308 | A1 | 7/2007 | Rausch |
| 2010/0185700 | A1 | 7/2010 | Bodain |

OTHER PUBLICATIONS

Dowling, Jim, and Vinny Cahill. "The k-component architecture meta-model for self-adaptive software." Metalevel architectures and separation of crosscutting concerns. Springer Berlin Heidelberg, 2001. pp. 81-88.*

Salehie, Mazeiar, and Ladan Tahvildari. "Self-adaptive software: Landscape and research challenges." ACM Transactions on Autonomous and Adaptive Systems (TAAS) 4.2 (2009): pp. 14-14:42.*

U.S. Appl. No. 12/187,410 as of Oct. 18, 2013.

Appeal Brief filed Aug. 15, 2010, for U.S. Appl. No. 11/144,121, filed Jun. 3, 2005; pp. 1-33.

Notice of Appeal filed Jun. 14, 2010, for U.S. Appl. No. 11/144,121, filed Jun. 3, 2005; p. 1.

Final Office Action (Mail Date Mar. 12, 2010), for U.S. Appl. No. 11/144,121, filed Jun. 3, 2005; pp. 1-14.

List of References filed Mar. 12, 2010, for U.S. Appl. No. 11/144,121, filed Jun. 3, 2005; pp. 1-33.

List of References filed Mar. 12, 2010, for U.S. Appl. No. 11/144,121, filed Jun. 3, 2005; pp. 1-4.

Amendment/Request for Reconsideration After Non-Final Rejection filed Dec. 14, 2009, for U.S. Appl. No. 11/144,121, filed Jun. 3, 2005; pp. 1-24.

Non-Final Rejection (Mail Date Sep. 16, 2009), for U.S. Appl. No. 11/144,121, filed Jun. 3, 2005; pp. 1-15.

List of References filed Sep. 16, 2009, for U.S. Appl. No. 11/144,121, filed Jun. 3, 2005; p. 1.

List of References filed Sep. 16, 2009, for U.S. Appl. No. 11/144,121, filed Jun. 3, 2005; p. 1-4.

Information Disclosure Statement Form (SB08) filed Jun. 3, 2005, for U.S. Appl. No. 11/144,121, filed Jun. 3, 2005; p. 1.

Michel, Tilman, "Designing for Change, a Dynamic Perspective," http://users.pandora.be/michel.tilman/Publications/GCSE2000KN.doc Lecture Notes of Computer Science, vol. 2177, Springer-Verlag, 2001.

Non-Final Office Action (Mail date Sep. 27, 2011) for U.S. Appl. No. 12/332,573, filed Dec. 11, 2008; pp. 1-16.

Movva et al., Syntactic and Semantic Metadata Integration for Science Data Use; Computers and Geosciences 31 (2005) 1126-1134.

Office Action (Mail Date Jan. 3, 2008) for U.S. Appl. No. 11/243,857, filed Oct. 4, 2005; pp. 1-33.

Amendment filed May 5, 2008 in response to Office Action (Mail Date Jan. 3, 2008) for U.S. Appl. No. 11/243,857, filed Oct. 4, 2005; pp. 1-13.

Notice to the applicant regarding a non-compliant or non-responsive amendment dated Jun. 17, 2008 Amendment filed May 5, 2008 in response to Office Action (Mail Date Jan. 3, 2008) for U.S. Appl. No. 11/243,857, filed Oct. 4, 2005.

Supplemental Amendment in response to non-compliant or non-responsive amendment dated Jun. 17, 2008 Amendment filed May 5, 2008 in response to Office Action (Mail Date Jan. 3, 2008) for U.S. Appl. No. 11/243,857, filed Oct. 4, 2005, pp. 1-13.

Final Rejection (Mail Date Jun. 24, 2009) for U.S. Appl. No. 11/243,857, filed Oct. 4, 2005, pp. 1-37.

Amendment Submitted/Entered with Filing of CPA/RCE filed Sep. 22, 2009 in response to Final Rejection (Mail Date Jun. 24, 2009) for U.S. Appl. No. 11/243,857, filed Oct. 4, 2005, pp. 1-14.

Request for Continued Examination (RCE) Transmittal filed Sep. 22, 2009 for U.S. Appl. No. 11/243,857, filed Oct. 4, 2005, pp. 1-3.

Non-Final Rejection (Mail Date Dec. 7, 2009) for U.S. Appl. No. 11/243,857, filed Oct. 4, 2005, pp. 1-18.

Amendment/Req. Reconsideration-After Non-Final Rejection; Filing Date Mar. 5, 2010, in response to Non-Final Rejection (Mail Date Dec. 7, 2009) for U.S. Appl. No. 11/243,857, filed Oct. 4, 2005, pp. 1-22.

Final Rejection (Mail Date Jul. 7, 2010) for U.S. Appl. No. 11/243,857, filed Oct. 4, 2005, pp. 1-17.

Amendment Submitted/Entered with Filing of CPA/RCE filed Oct. 5, 2010 in response to Final Rejection (Mail Date Jul. 7, 2010) for U.S. Appl. No. 11/243,857, filed Oct. 4, 2005, pp. 1-19.

Request for Continued Examination (RCE) Transmittal filed Oct. 5, 2010 for U.S. Appl. No. 11/243,857, filed Oct. 4, 2005, pp. 1-3.

Non-Final Rejection (Mail Date Oct. 27, 2010) for U.S. Appl. No. 11/243,857, filed Oct. 4, 2005, pp. 1-27.

Amendment/Req. Reconsideration After Non-Final Rejection filed Feb. 16, 2011 in response to Non-Final Rejection (Mail date Oct. 27, 2010) for U.S. Appl. No. 11/243,857, filed Oct. 4, 2005, pp. 1-24.

Notice of Allowance and Fees Due (Mail Date Apr. 28, 2011) for U.S. Appl. No. 11/243,857, filed Oct. 4, 2005, pp. 1-9.

Request for Continued Examination (RCE) Transmittal filed Jun. 2, 2011, U.S. Appl. No. 11/243,857, filed Oct. 4, 2005, pp. 1-3.

Notice of Allowance and Fees Due (Mail Date Jun. 23, 2011) for U.S. Appl. No. 11/243,857, filed Oct. 4, 2005, pp. 1-9.

Preliminary Amendment filed Aug. 27, 2009 for U.S. Appl. No. 12/332,573, filed Dec. 11, 2008, pp. 1-3.

(56) References Cited

OTHER PUBLICATIONS

IBM, e-Science platform for cross-institutional, interdisciplinary, collaborative research in emerging sciences and technologies, IP.com No. IPCOM000134640D, Published Mar. 13, 2006.
IBM, Method and system for obtaining a price quotation from multiple remote distributors in real time using Internet and communication API, IP.com No. IPCOM000021806D, Published Feb. 9, 2004, pp. 1-6.
Russinovich, et al. Encrypting File System Security, Microsoft Windows Internals, Fourth Edition: Microsoft Windows Server TM 2003, Windows XP, and Windows 200, Dec. 8, 2004, Chapter 12.
Russinovich, et al. Volume Management, Microsoft Windows Internals, Fourth Edition: Microsoft Windows Server TM 2003, Windows XP, and Windows 200, Dec. 8, 2004, Chapter 10.
Russinovich et al., Microsoft Windows Internals, Dec. 8, 2004, Microsoft Press, Fourth Edition.
Batter et al, MCSE Windows XP Professional Exam Cram 2 (Exam 70-270), Nov. 2002, Exam Cram.
Microsoft, "How to Deploy Office XP over a network", Sep. 13, 2004, Microsoft.
Microsoft, "How to: Use Group Policy to Remotely Install Software in Windows 2000", Sep. 22, 2003, Microsoft.
Microsoft, "Domain Controller Roles", Mar. 28, 2003, Microsoft.
Fullerton et al., "Special Edition Using Microsoft Active Directory", Mar. 28, 2001, Que.
Ding et al., Swoogle: A Semantic Web Search and Metadata Engine, Dept. of Computer Science and Electronic Engineering, Univ. of Maryland Baltimore County, Baltimore MD 21250, USA, CKIM 2004. http://ebiquity.umbc.edu/_file_directory_papers/116.pdf.
Duval et al, Metadata Principles and Practicalities. D-Lib Magazine, Apr. 2002, vol. 8, No. 4, ISSN 1082-9873, 10 pages.
Hauch, et al., Information Intelligence: Metadata for Information Discovery, Access, and Integration. SIGMOD 2005 Jun. 14-16, 2005. Baltimore Maryland, USA. ACM 1-59593-060—Apr. 5, 2006, pp. 793-798.
Movva et al., Syntactic and Semantic Metadata Integration for Science Data Use. Computers & Geosciences 31 (2005) 1126-1134.
Qin et al., The Semantic and Syntactic Model of Metadata. [online]. 9 pages. [retrieved on Jan. 21, 2008.] Retrieved from the Internet:< URL: http//web.syr.edu/-jqin/papers/Metadata_model.pdf>.
Shasharina et al., FSML: Fusion Simulation Markup Language for Interoperability of D. Analysis Tools. Proceedings. Challenges of Large Applications in Distributed Environments, Jul. 24, 2005. 7 pages. ISBN-10: 0 7803 9043 1.
High Overhead. [online]. 2 pages. [retrieved on Jun. 21, 2008]. Retrieved from the Internhet: < URL: http://code 916.gsfc.nasa.gov/Data_services/doc?df/node10.html>.
Berhane Zewdie and C.R. Carlson, "Adaptive Component Paradigm for Highly Configurable Business Components," 2006 IEEE International Conference Electro/Information Technology, Pub. Date May 7-10, 2006, pp. 185-190.
Chang, F., Karamcheti, V., Automatic Configuration and Run-Time Adaptation of Distributed Applications, Bell Labs, retrieved from http://www.bell-labs.com/user/fangzhe/pub/hpdc-adapt.pdf [last accessed Apr. 19, 2012), Aug. 2000.

\* cited by examiner

SOFTWARE ENGINEERING SYSTEM AND METHOD FOR SELF-ADAPTIVE DYNAMIC SOFTWARE COMPONENTS

CROSS REFERENCE TO RELATED APPLICATION

The present application claims priority to Canadian patent application number 2607537, filed on Oct. 22, 2007, and to U.S. patent application Ser. No. 12/187,410, filed on Aug. 7, 2008, which is are hereby incorporated by reference herein in its their respective entireties.

Applicant hereby rescinds all limitations or disclaimers that may have been expressed or implied by applicant's remarks or applicant's amendments of the claims in all other patent applications, including the parent application (U.S. patent application Ser. No. 12/187,410). Applicant respectfully requests that the Examiner examine the claims presented in this Continuing Application solely on their merits and independent of said limitations and disclaimers. Applicant respectfully requests that the Examiner revisit all prior art, including references cited against any claims in the other patent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of Invention

The present invention relates generally to software engineering systems and methods for self-adaptive dynamic software components. More particularly, the present invention relates to a novel approach to engineering self-adaptive dynamic software components with the introduction of a "control interface" in addition to the interfaces for input data and output data. The control interface may receive as an input one or more environment-specific or domain-specific conditions and/or parameters which may be used to dynamically configure the software components to perform appropriately in specific environments or domains.

2. Detailed Description

Today's businesses face unprecedented changes and heavily depend on information technology (IT) for adapting to the changes and for efficient operations with high productivity. And yet, IT has become a major bottleneck for business transformation or optimization due to the long lead time required to implement new processes/functions or changes in the business models and processes.

The business processes continuously change while today's IT solutions are often not flexible enough to adapt to the changes in time and on budget. For example, one-third of IT projects run over time, one-fifth run over budget and one-fifth fall short of planned functionality according to the recent studies. Consequently, there is quite often a significant mismatch between the business process and the deployed IT solution for the business.

One source of the problem is the current software engineering model where the software design is based on static components, i.e., the functional behaviour of a software component is statically defined inside of software components and any changes to the functional behaviour of a component requires redevelopment of the component.

Using the traditional approach to model a business into software engineering, a business operation needs to be decomposed into autonomous functional units. Then, the business functional units are mapped to software components, and the interfaces are specified for the software components to receive input data and to produce output data. All the business rules, functional behaviour, and business processes associated with the components are embedded inside the functional components. This may result in a rigid, inflexible approach to software development.

SUMMARY

This present invention relates to software engineering systems and methods for self-adaptive dynamic software components. More particularly, the present invention proposes a novel approach to engineering self-adaptive dynamic software components with the introduction of a "control interface" in addition to the interfaces for input data and output data. The control interface may receive as an input one or more environment-specific or domain-specific conditions and/or parameters which may be used to dynamically configure the software components to perform appropriately in specific environments or domains.

In an aspect, there is provided a method of engineering a software component, comprising: providing the software component with an input interface, an output interface, and a control interface, the control interface being configurable to receive external conditions or parameters that are specific to an environment or to a domain; providing one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed.

In an embodiment, the method further comprises providing a feedback loop configured to communicate output data from the output interface to the one or more externally modifiable adapters.

In another embodiment, the method further comprises modifying one or more externally modifiable adapters in dependence upon the output data received via the feedback loop.

In another embodiment, the method further comprises selecting an externally modifiable adapter in dependence upon external conditions or parameters that are specific to an environment or to a domain in which the software component is to be executed; and dynamically binding the selected externally modifiable adapter to the software component in dependence upon external conditions or parameters that are specific to an environment or to a domain in which the software component is to be executed.

In another embodiment, the selected externally modifiable adapter is dynamically bound to the software component using the dynamic binding capability of a programming language in dependence upon external conditions or parameters that are specific to an environment or to a domain in which the software component is to be executed.

In another embodiment, the one or more externally modifiable adapters are human readable and modifiable by a human expert.

In another aspect, there is provided a system for engineering a software component, comprising: an input interface, an output interface, and a control interface provided on the software component, the control interface being configurable to receive external conditions or parameters that are specific to an environment or to a domain; one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed.

In an embodiment, the system further comprises a feedback loop configured to communicate output data from the output interface to the one or more externally modifiable adapters.

In another embodiment, the system further comprises means for modifying one or more externally modifiable adapters in dependence upon the output data received via the feedback loop.

In another embodiment, the system further comprises means for selecting an externally modifiable adapter in dependence upon external conditions or parameters that are specific to an environment or to a domain in which the software component is to be executed; and means for dynamically binding the selected externally modifiable adapter to the software component in dependence upon external conditions or parameters that are specific to an environment or to a domain in which the software component is to be executed.

In another embodiment, the selected externally modifiable adapter is configured to be dynamically bound to the software component using the dynamic binding capability of a programming language in dependence upon external conditions or parameters that are specific to an environment or to a domain in which the software component is to be executed.

In another embodiment, the one or more externally modifiable adapters are human readable and modifiable by a human expert.

In another aspect, there is provided a data processor readable medium storing data processor code that when loaded into a data processor adapts the data processor to perform a method of engineering a software component, comprising: code for providing the software component with an input interface, an output interface, and a control interface, the control interface being configurable to receive external conditions or parameters that are specific to an environment or to a domain; code for providing one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed.

In an embodiment, the data processor readable medium further comprises code for providing a feedback loop configured to communicate output data from the output interface to the one or more externally modifiable adapters.

In another embodiment, the data processor readable medium further comprises code for modifying one or more externally modifiable adapters in dependence upon the output data received via the feedback loop.

In an embodiment, the data processor readable medium further comprises code for selecting an externally modifiable adapter in dependence upon external conditions or parameters that are specific to an environment or to a domain in which the software component is to be executed; and code for dynamically binding the selected externally modifiable adapter to the software component in dependence upon external conditions or parameters that are specific to an environment or to a domain in which the software component is to be executed.

In an embodiment, the data processor readable medium further comprises code for dynamically binding the selected externally modifiable adapter to the software component using the dynamic binding capability of a programming language in dependence upon external conditions or parameters that are specific to an environment or to a domain in which the software component is to be executed.

In an embodiment, the data processor readable medium further comprises for configuring the externally modifiable adapters to be human readable and modifiable by a human expert.

These and other aspects of the invention will become apparent from the following more particular descriptions of exemplary embodiments.

BRIEF DESCRIPTION OF SEVERAL VIEWS OF THE DRAWINGS

The present invention will be more fully understood and appreciated by reading the following Detailed Description in conjunction with the accompanying drawings, in which.

DETAILED DESCRIPTION

Figure 1:
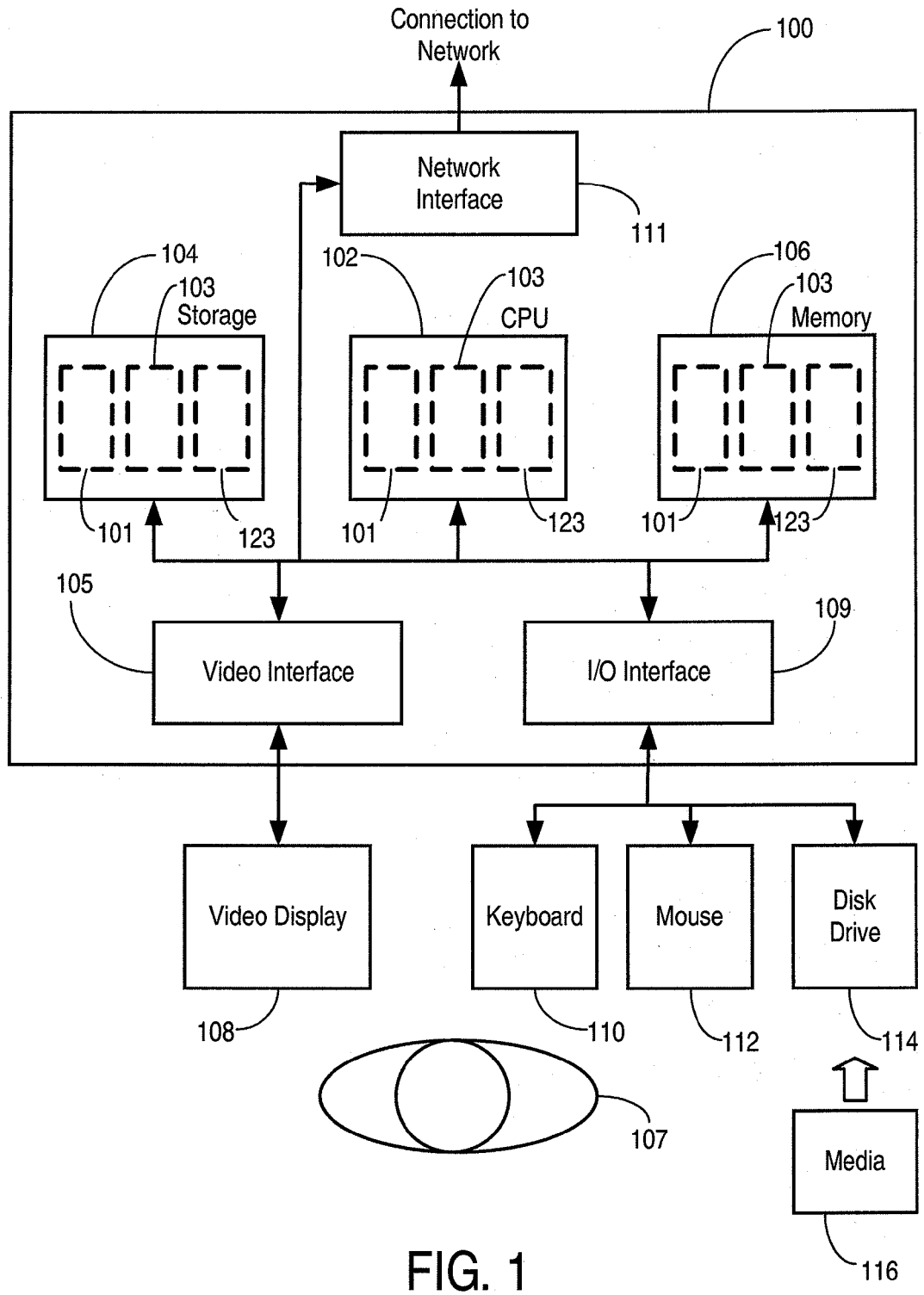
FIG. 1 shows a generic data processing system that may provide a suitable operating environment.

The present invention will be more fully understood and appreciated by reading the following Detailed Description in conjunction with the accompanying drawings, wherein like reference numerals refer to like parts throughout.

As noted above, the present invention relates to software engineering systems and methods for self-adaptive dynamic software components.

The invention may be practiced in various embodiments. A suitably configured data processing system, and associated communications networks, devices, software and firmware may provide a platform for enabling one or more embodiments. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

Figure 2:
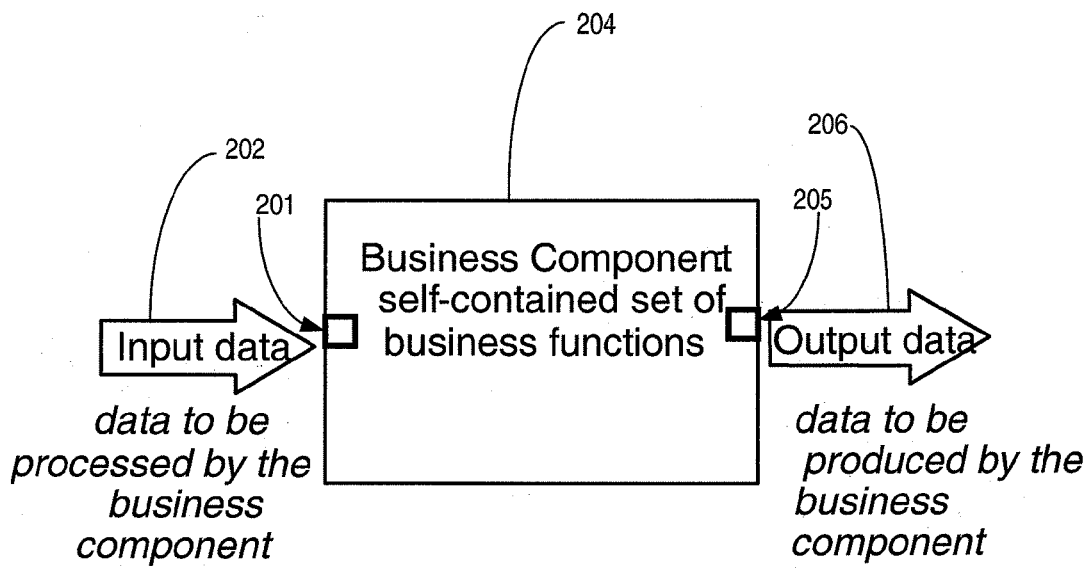
FIG. 2 shows a schematic block diagram of a traditional component model.

Now referring to FIG. 2, shown is a traditional component model in which input data 202 is processed by a software component 204 to always produce the same output data 206 regardless of any environmental parameters. As such, when there are changes in the conditions or parameters, the component needs to be redeveloped to reflect those changes. Any changes in the business rules, functions, control flows between functions, or data attributes or formats also require the software component to be modified or redeveloped. Generally speaking, the lead time required for the IT professionals to understand and interpret the business changes, reflect the changes into the software design, identify the affected software components, redevelop the software components, test and deploy a new system is much longer than the time for the business to change, and consequently IT departments may be continuously in a catch-up mode.

In the traditional component modeling as illustrated in FIG. 2, each software component 204 has only two external interfaces: an input interface 201 for receiving input data 202 and an output interface 205 for producing output data 206. In the traditional approach, the output data 206 is simply a function of the input data 202, and the component 204 needs to be re-designed and re-developed to adapt to changes in business rules because the program logics to handle the business rules are hard-coded within the component 204.

In order to address some of the limitations inherent to the traditional component model of FIG. 2, an embodiment of the present invention provides a new approach to software engineering in which software components are able to adapt to changes in conditions or parameters in a more responsive way and with minimal or no additional programming effort.

Figure 3:
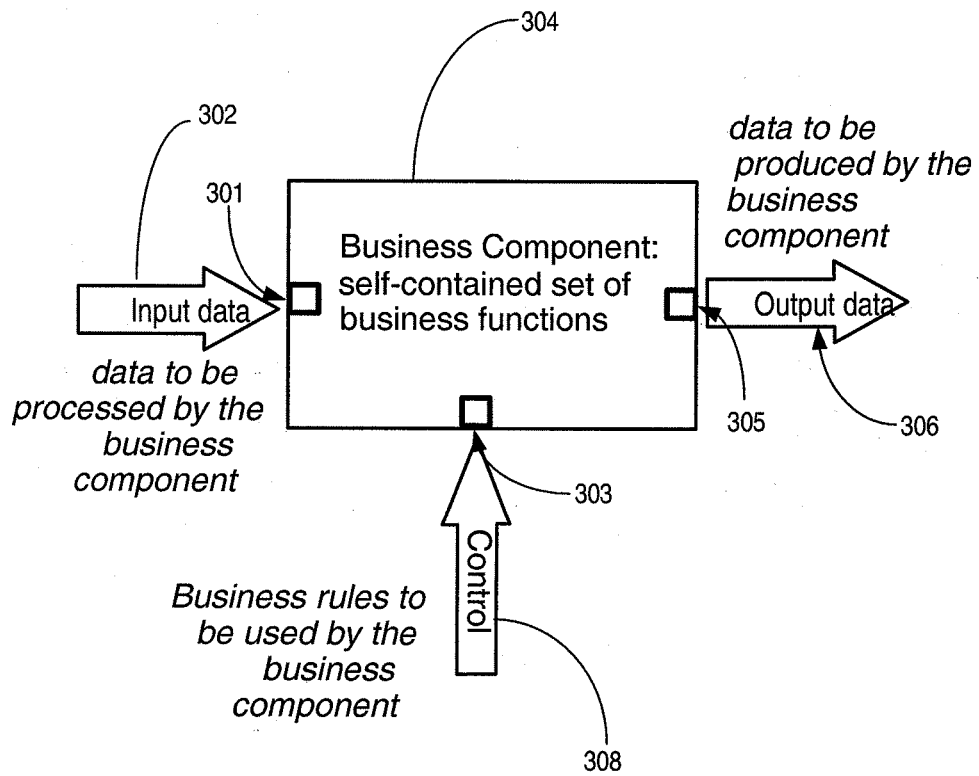
FIG. 3 shows a schematic block diagram of a new dynamic component model in accordance with an embodiment.

More generally, as illustrated in FIG. 3, each software component engineered in accordance with an embodiment of the present invention has at least three external interfaces: (1) an input interface 301 for receiving input data 302 to be processed by the component; (2) a control interface 303 for controlling the internal behaviour of software component 304 by providing the business rules or environmental conditions and/or parameters (via control input 308) associated with processing the input data 302 and producing output data 306; and (3) an output interface 305 for producing output data 306. Thus, the output data 306 is now a function of the input data 302 as well as the control input 308.

In an embodiment, the control interface for receiving the business rules or environmental conditions and/or parameters 308 may be provided in an external human-readable as well as machine-readable format. As such, the software component 304 can be dynamically configured, or re-configured, as necessary to change the internal behaviour of a business component to adapt to changing business rules or to changing environmental variables, without any significant programming effort. This approach and method for software engineering in accordance with various embodiments of the present invention is referred to hereinafter as "self-adaptive dynamic component modeling".

The self-adaptive dynamic component modelling in accordance with an embodiment of the present invention automatically adapts to external variances or changes introduced via a control interface (e.g. control interface 303) and thus obviates the need for re-developing a component 304 to adapt to business changes, to adapt to environmental variances, or to address the variances of business rules for a specific organization or geography. Thus, self-adaptive dynamic component modelling may be viewed as a foundation for realization and implementation of autonomous computing based on varying control inputs.

Figure 4:
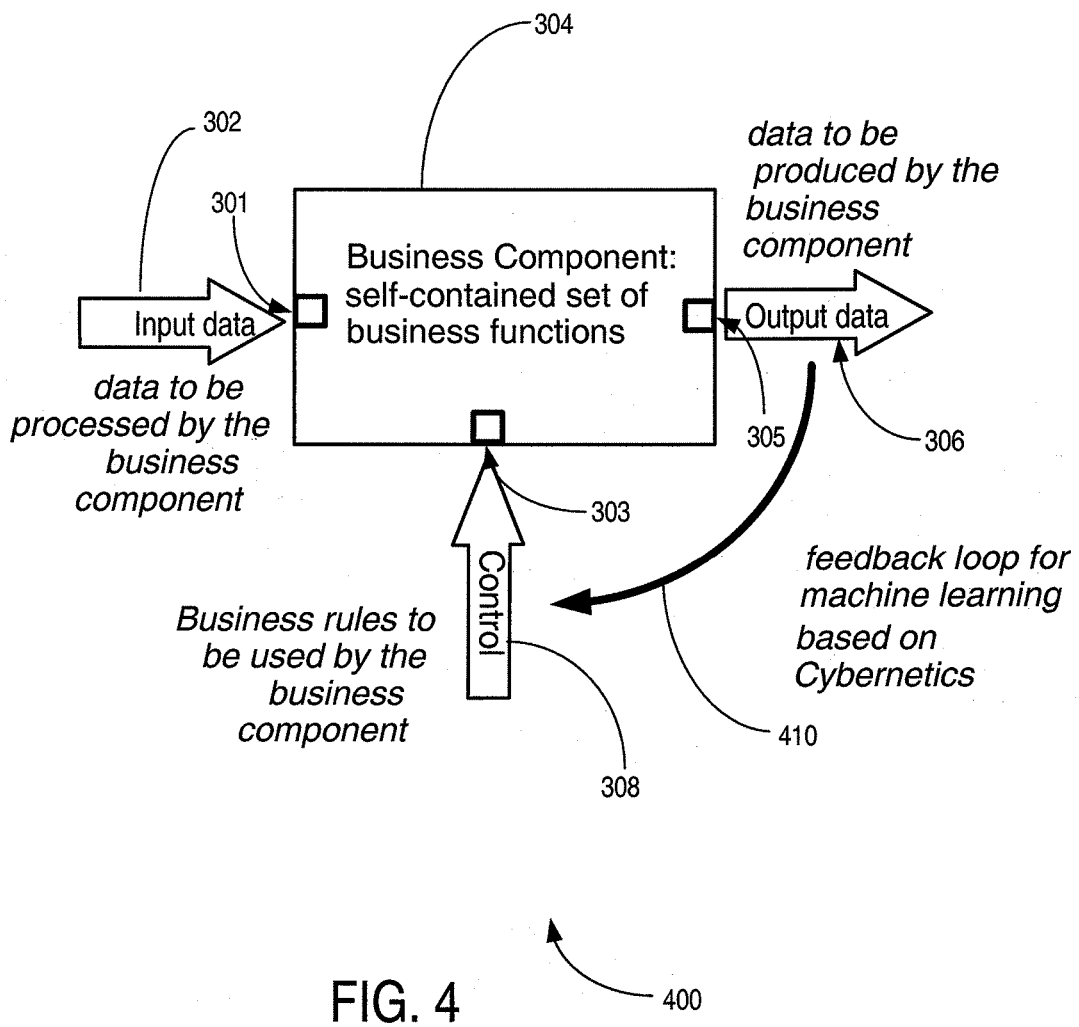
FIG. 4 shows a schematic block diagram of a new dynamic component model in accordance with another embodiment.

Now referring to FIG. 4, the software component 304 of FIG. 3 may be extended for machine learning by reflecting the output data 306 from the component 304 on the control input 308, via a feedback loop 410, so that the component 304 can adjust its functional behaviour based on the result of the previous processing step or iteration. This feedback loop facility enables the component 304 to learn from experiences and dynamically adjust its behaviour, thus improving the intelligence and dynamic adaptability of the component 304.

Dynamic component modeling also enables a "roaming" software component that is self-adaptive to the target runtime environment. A roaming software component in a distributed computing environment is not necessarily aware of the system platform properties (e.g., operating system, database management system, transaction management system, file systems) when it arrives on a remote system. Therefore, the roaming software component needs to discover dynamically the conditions and parameters associated with the system platform upon arrival and self-adapt to the target runtime platform. This self-adaptability of a roaming software component may be critical, especially in a distributed computing environment involving heterogeneous systems. In the absence of this self-adaptability in the traditional software engineering model, a separate software component needs to be developed for each runtime platform even though the functional capability is identical. For example, we need different versions of a word processor with identical functional capability for Windows® operating system, Linux® operating system, Apple® computer, and so on. In this dynamic component modeling of this present invention for self-adaptive software component, the software component interacts through three external interfaces: one for accessing input data (the "input" interface), another for producing output data (the "output" interface), and the other (the "control" interface) for accepting environmental variables and characteristics to adjust the internal behaviour of the software component accordingly with the runtime parameters.

For the purposes of illustration in FIG. 5, the following terms are used and the definitions of the terms are as follows: (1) "environment-neutral" subcomponent represents a subcomponent of a software component which implements business functions that are independent of the computer system platform or environment (e.g., a word processor, a mortgage calculator); (2) "environment-specific" subcomponents represent a set of subcomponents of a software component which implement the system functions that are specific to computer system platforms (e.g., IBM® z/OS®, IBM® AIX®, Microsoft® Windows®, Red Hat® Enterprise Linux®) or environment (e.g., IBM® DB2®, Oracle® Database, IBM® WebSphere®); (3) "domain-neutral" subcomponent represents a subcomponent of a software component which implements business functions that are independent of industry or business domains (e.g., software component for customer information management); and (4) "domain-specific" subcomponents represent a set of subcomponents of a software component which implement business functions that are specific to business domains (e.g., mortgage calculation rules specific to a financial institution, de-identification rules for compliance to privacy laws of a specific country).

Figure 5:
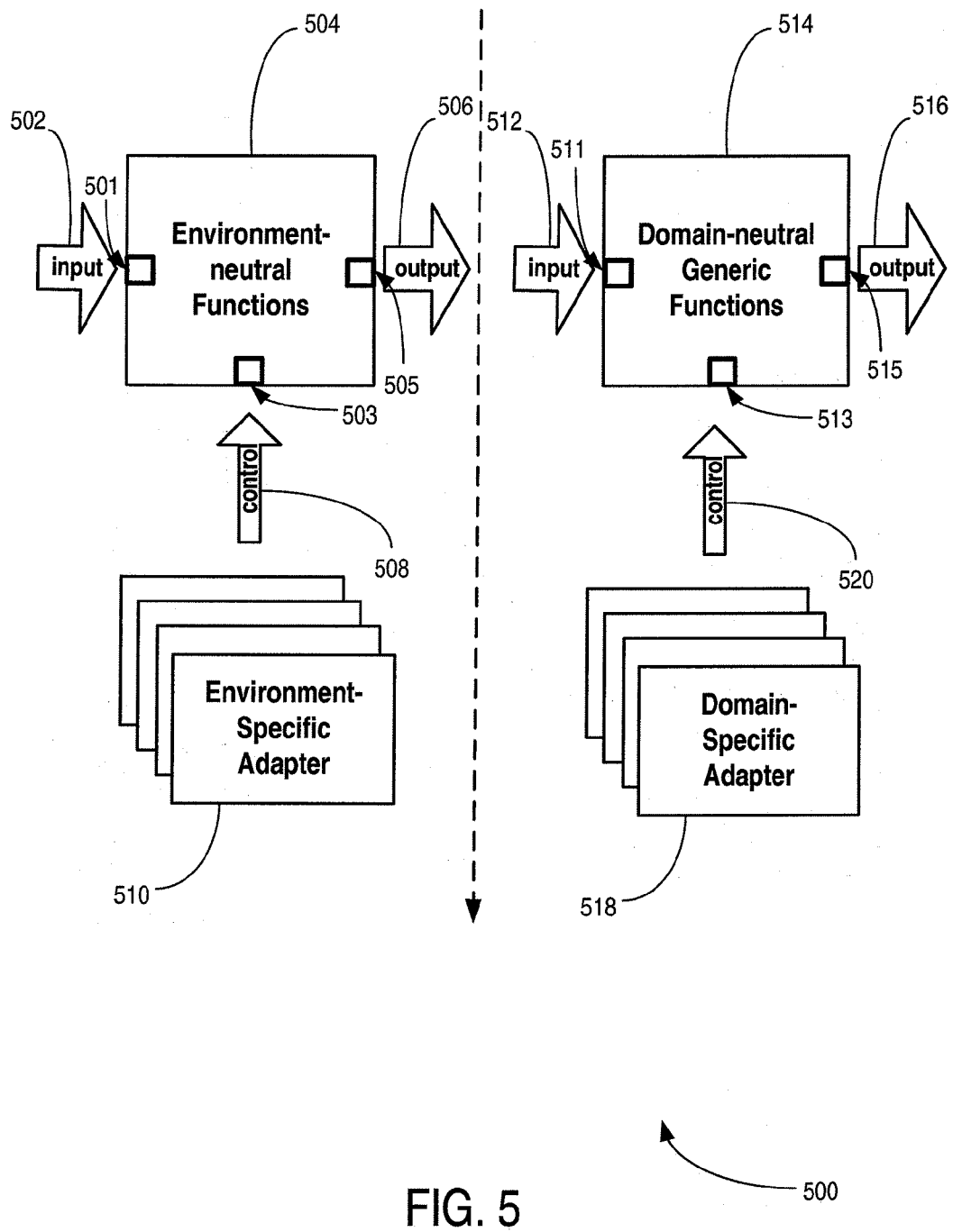
FIG. 5 shows schematic block diagrams of two component models dynamically bound during deployment in accordance with another embodiment.

Now referring to FIG. 5, shown is a schematic block diagram 500 of an illustrative self-adaptive dynamic software component in which a software component may be decomposed into two subcomponents: (1) an environment-neutral first subcomponent 504 and (2) a domain-neutral second component 514.

As shown in FIG. 5, the environment-neutral first subcomponent 504 may include a data input 502 received at input interface 501, data output 506 generated at output interface 505, and environment-specific adapters 510 that may be dynamically bound by control input 508 to the first subcomponent 504 via control interface 503, based on the dynamic binding capabilities of various programming languages (e.g., dynamic link of Java™, virtual function of Java™, rendezvous of Ada). A suitable environment-specific adapter 510 may be selected to handle (i.e. self-adapt to) the conditions and parameters specific to the computer system platform or parameters, and to keep the first subcomponent 504 independent of the environment through an architectural and design technique of separation of concerns. In this case, the first subcomponent 504 and one of the environment-specific adapters 510 bound to the first subcomponent 504 will constitute an environment-specific subcomponent that will be self-adaptive to the computer system platform conditions and environmental parameters. This may be done by using the input interface 501 to receive input data 502, the control interface 503 to receive environmental conditions and parameters via control input 508, and the output interface 505 to produce output data 506.

In the same manner, the domain-neutral generic second subcomponent 514 may be bound to one of the domain-specific adapters 518 via control input 520 based on the dynamic binding capability of various programming languages (e.g., dynamic link of Java, virtual function of Java, rendezvous of Ada). The control interface 513 of second subcomponent 514 may be used to handle (i.e. self-adapt to) the business rules and parameters specific to particular industries or business domains, thereby keeping the business functions in the second subcomponent 514 generic for business agility and flexibility to changes through an architectural and design technique of separation of concerns. In this case, the second subcomponent 514 and one of the domain-specific adapters 518 will constitute a domain-specific software subcomponent that will be self-adaptive to the business rules and parameters that are specific to a business domain. This is done by using the input interface 511 to receive input data 512, the control interface 513 to accept domain-specific business rules and parameters via control input 520, and the output interface 515 to produce output data 516.

In summary, there is a subcomponent 504 that is environmentally neutral which is bound to one of environment-specific adapters 510, and another subcomponent 514 that performs generic functions but which is bound to one of domain-specific adapters 518 depending on the specific technology environment or a business domain in which the subcomponents 504 or 514 must operate. Multiple subcomponents (510, 518 etc.) may be developed, as required, for various technology environments or for various business domains. When an environment neutral and generic software component (comprising subcomponents 504 and 514) is deployed to a specific environment for a specific domain, the corresponding adapters 510 and 518 that are specific to the environment and the domain will be dynamically bound to the subcomponents 504 and 514 accordingly.

Figure 6:
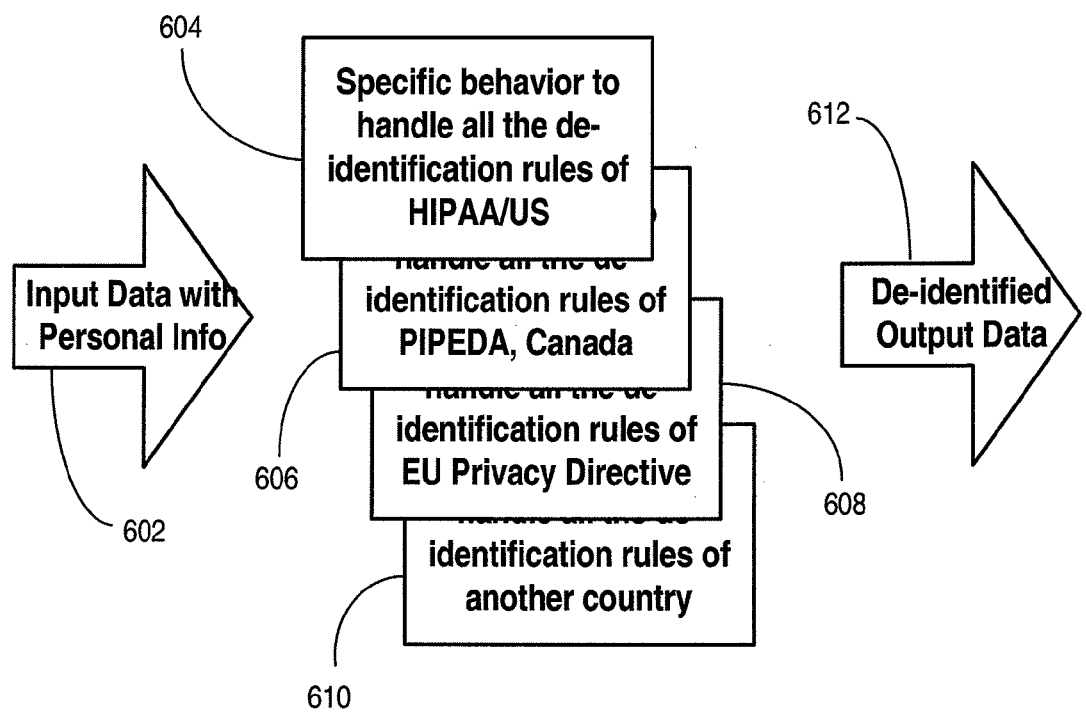
FIG. 6 shows a schematic block diagram of an illustrative de-identification component based on traditional component business modelling.

Now referring to FIG. 6, shown is an illustrative example of a software application for de-identification of protected personal information to comply with the privacy laws. As shown, using a traditional component business model (previously illustrated in FIG. 2), it may be necessary to build multiple components 604, 606, 608, 610 to address the specific requirements in each country or industry, because the de-identification rules are subject to different statutory requirements applicable to those countries or industries.

Figure 7:
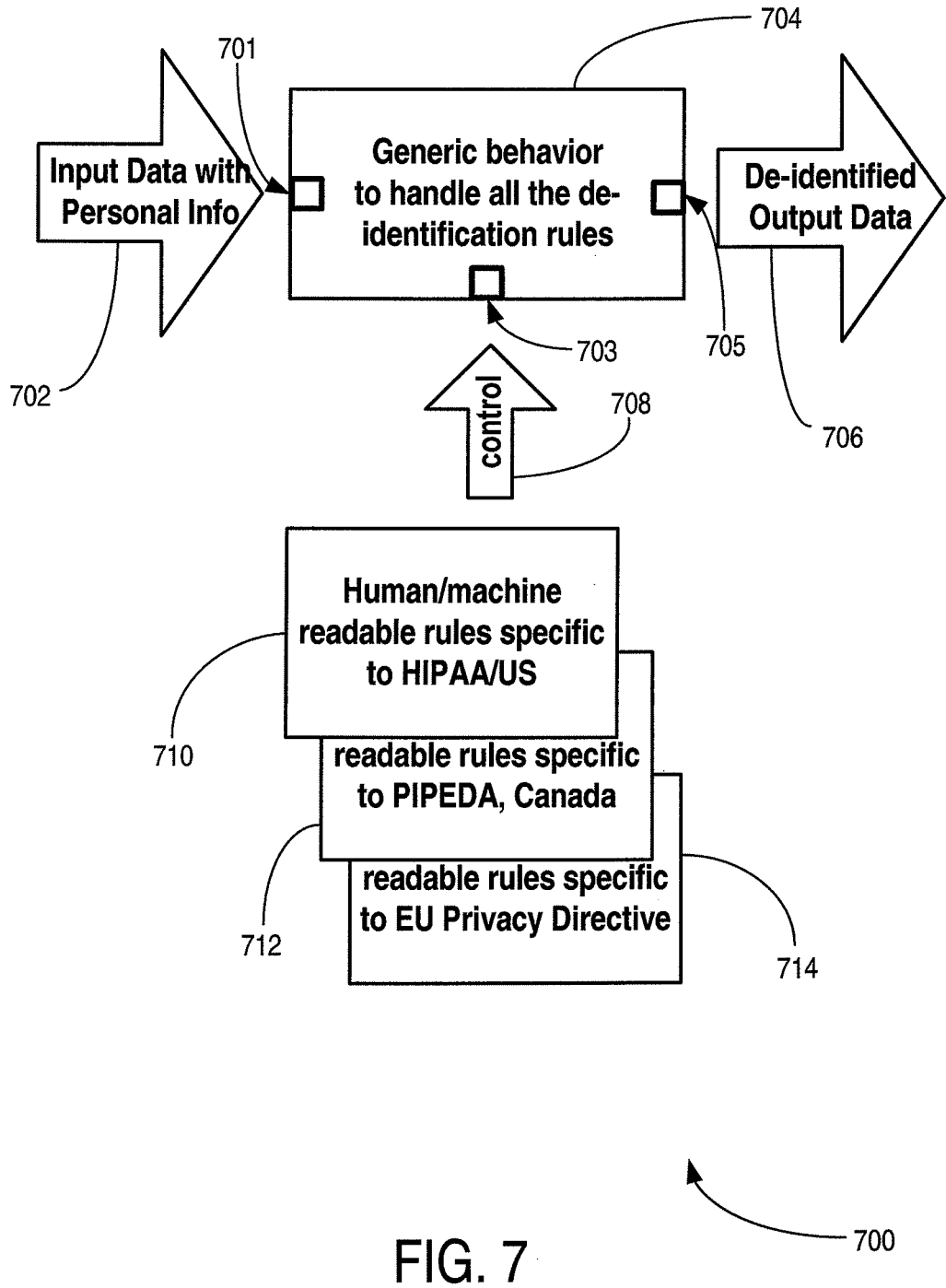
FIG. 7 shows a schematic block diagram of an illustrative de-identification component based on the new dynamic component model in accordance with an embodiment.

In contrast, FIG. 7 shows a schematic block diagram 700 of an illustrative software application for de-identification of protected personal information engineered according to an embodiment of the present invention. As shown, rather than having multiple components 604, 606, 608, 610 to address each specific country or industry, a self-adaptive dynamic component 704 may be configured to receive input data 702 with personal information at input interface 701, receive at control interface 703 control input 708 comprising country or industry specific adapters 710, 712, 714 to produce de-identified output data 706 at output interface 705. With this approach, the software component 704 for de-identification of protected personal information to comply with privacy laws may be suitably configured to handle all generic behaviour for de-identification, and it is then necessary only to provide new country or industry specific adapters or control files to address country or industry specific rules. This new approach obviates the need to develop multiple software components. In addition, when the environment-specific or domain-specific externally modifiable adapter is human-readable as well as machine-readable (e.g. a document in XML notation), a human expert such as a business analyst or a lawyer can provide the control information necessary for the de-identification component.

Figure 8:
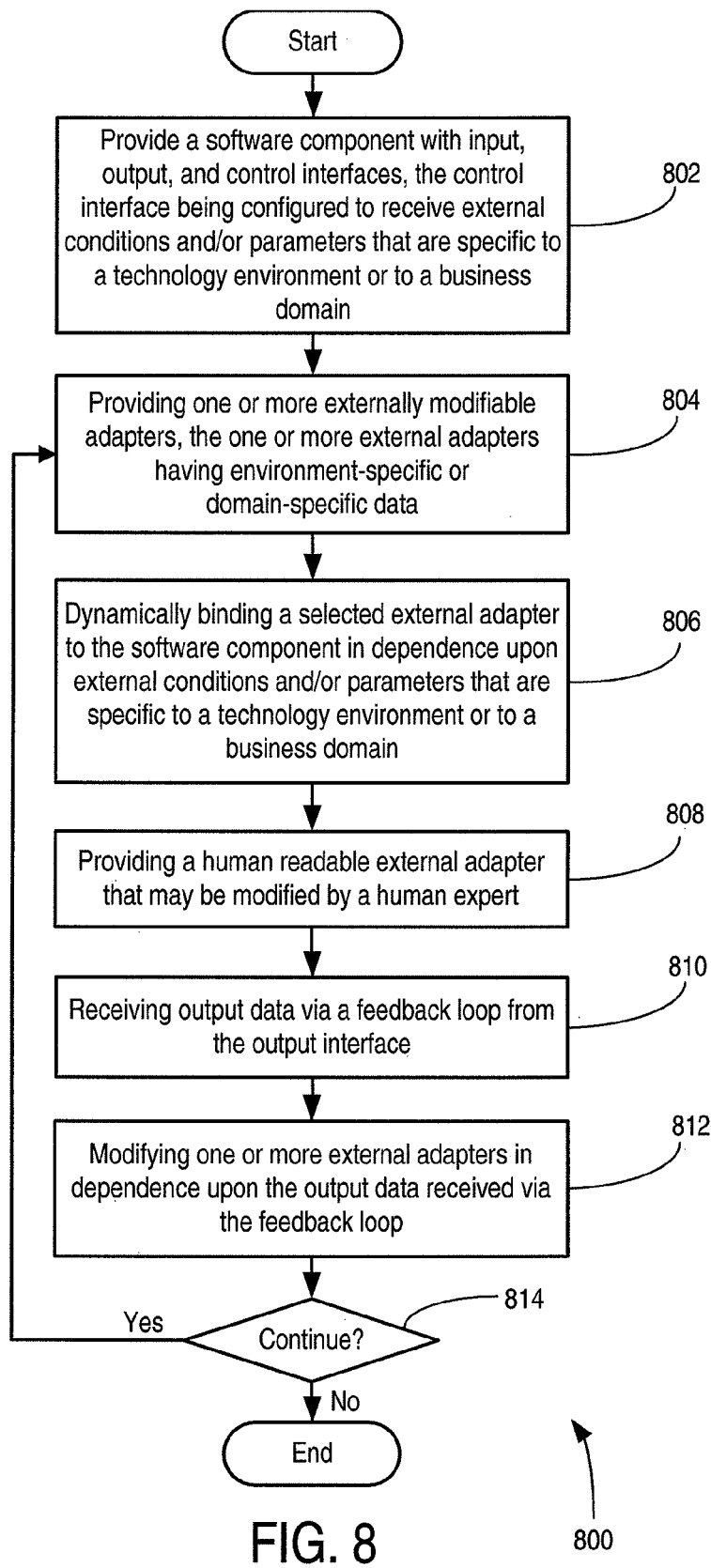
FIG. 8 shows a schematic flowchart of a method in accordance with an embodiment.

Now referring to FIG. 8, shown is an illustrative method 800 in accordance with an embodiment. As shown, method 800 begins and at block 802 provides a software component having input, output, and control interfaces, the control interface being configured to receive external conditions and/or parameters that are specific to environment or to business domains.

Method 800 then proceeds to block 804, where one or more externally modifiable adapters may be provided, the one or more externally modifiable adapters having environment-specific or domain-specific data.

Method 800 then proceeds to block 806, where a selected externally modifiable adapter may be dynamically bound to the software component in dependence upon external conditions and/or parameters that are specific to an environment or domain. For example, an environment-specific external adapter may be selected based on the external conditions and/or parameters that are specific to a technology environment, and this environment-specific external adapter may be dynamically bound to the software component based on the dynamic binding capability of various programming languages (e.g., dynamic link of Java, virtual function of Java, rendezvous of Ada).

Method 800 may then proceed to block 808, where method 800 may provide a human readable externally modifiable adapter that may be modified by a human expert (i.e. a technology or business analyst familiar with a technology environment.)

Method 800 may then proceed to block 810, where method 800 may receive output data from the output interface via a feedback loop.

Method 800 may then proceed to block 812, where one or more of the externally modifiable adapters may be modified in dependence upon the output data received via the feedback loop.

Method 800 may then proceed to decision block 814, where method 800 may continue after modification of one or more externally modifiable adapters by returning to block 804. Otherwise, method 800 may end. As will be appreciated, this continuous loop may be used to dynamically adjust one or more of the environment-specific or domain-specific externally modifiable adapters such that the output data may be adjusted based on the previous output data under the similar circumstances, and thus enabling machine learning.

While various illustrative embodiments of the invention have been described above, it will be appreciated by those skilled in the art that variations and modifications may be made. Thus, the scope of the invention is defined by the following claims.

The invention claimed is:

1. A method of engineering a software component, comprising:
    providing the software component with an input interface, an output interface, and a control interface, the control interface being configurable to receive external conditions or parameters that are specific to an environment or to a domain, and to allow said software component to automatically and dynamically adapt to said received external conditions or parameters during runtime, wherein said automatic and dynamic adaptation is not dictated by the activation of preprogrammed code within said software component;
    providing one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed;
    providing a feedback loop configured to communicate output data from the output interface to the one or more externally modifiable adapters; and
    modifying the one or more externally modifiable adapters in dependence upon the output data received via the feedback loop.

2. The method of claim 1, further comprising:
    selecting an externally modifiable adapter in dependence upon external conditions or parameters that are specific to an environment or to a domain in which the software component is to be executed; and
    dynamically binding the selected externally modifiable adapter to the software component in dependence upon external conditions or parameters that are specific to an environment or to a domain in which the software component is to be executed.

3. The method of claim 2, wherein the selected externally modifiable adapter is dynamically bound to the software component using dynamic binding capability of a programming language in dependence upon external conditions or parameters that are specific to an environment or to a domain in which the software component is to be executed.

4. The method of claim 1, wherein the one or more externally modifiable adapters are human readable and modifiable by a human expert.

5. A system for engineering a software component, comprising:
    input data;
    output data;
    an input interface that receives input data, an output interface that produces the output data based on the input data, and a control interface provided on the software component, the control interface being configurable to receive external conditions or parameters that are specific to an environment or to a domain, and to allow said software component to automatically and dynamically adapt to said received external conditions or parameters during runtime, wherein said automatic and dynamic adaptation is not dictated by the activation of preprogrammed code within said software component;
    one or more externally modifiable adapters, the one or more externally modifiable adapters comprising a non-transitory storage medium having environment-specific or domain-specific data stored thereon, and being configurable to be dynamically bound to the software component in dependence upon external conditions or parameters that are specific to an environment or to a domain in which the software component is to be executed;
    a feedback loop configured to communicate output data from the output interface to the one or more externally modifiable adapters; and
    means for modifying the one or more externally modifiable adapters in dependence upon the output data received via the feedback loop.

6. The system of claim 5, further comprising:
    means for selecting an externally modifiable adapter in dependence upon external conditions or parameters that are specific to an environment or to a domain in which the software component is to be executed; and
    means for dynamically binding the selected externally modifiable adapter to the software component in dependence upon external conditions or parameters that are specific to an environment or to a domain in which the software component is to be executed.

7. The system of claim 6, wherein the selected externally modifiable adapter is configured to be dynamically bound to the software component using dynamic binding capability of a programming language in dependence upon external conditions or parameters that are specific to an environment or to a domain in which the software component is to be executed.

8. The system of claim 5, wherein the one or more externally modifiable adapters are human readable and modifiable by a human expert.

9. A data processor non-transitory readable medium storing data processor code that when loaded into a data processor adapts the data processor to perform a method of engineering a software component, comprising:
    code for providing the software component with an input interface, an output interface, and a control interface, the control interface being configurable to receive external conditions or parameters that are specific to an environment or to a domain, and to allow said software component to automatically and dynamically adapt to said received external conditions or parameters during runtime, wherein said automatic and dynamic adaptation is not dictated by the activation of preprogrammed code within said software component;
    code for providing one or more externally modifiable adapters, the one or more externally modifiable adapters having environment-specific or domain-specific data, and being configurable to be dynamically bound to the software component in dependence upon external conditions or parameters that are specific to an environment or to a domain in which the software component is to be executed;

code for providing a feedback loop configured to communicate output data from the output interface to the one or more externally modifiable adapters; and code for modifying the one or more externally modifiable adapters in dependence upon the output data received via the feedback loop.

10. The data processor non-transitory readable medium of claim 9, further comprising:

code for selecting an externally modifiable adapter in dependence upon external conditions or parameters that are specific to an environment or to a domain in which the software component is to be executed; and code for dynamically binding the selected externally modifiable adapter to the software component in dependence upon external conditions or parameters that are specific to an environment or to a domain in which the software component is to be executed.

11. The data processor non-transitory medium of claim 10, further comprising code for dynamically binding the selected externally modifiable adapter to the software component using dynamic binding capability of a programming language in dependence upon external conditions or parameters that are specific to an environment or to a domain in which the software component is to be executed.

12. The data processor non-transitory readable medium of claim 9, further comprising code for configuring the externally modifiable adapters to be human readable and modifiable by a human expert.

* * * * *